US008868564B1

(12) United States Patent  
Ogilvie (10) Patent No.: US 8,868,564 B1  
(45) Date of Patent: Oct. 21, 2014

(54) ANALYTIC COMPARISON OF LIBRARIES AND PLAYLISTS

(76) Inventor: John W. Ogilvie, Salt Lake City, UT (US)

( * ) Notice: Subject to any disclaimer, the term of this patent is extended or adjusted under 35 U.S.C. 154(b) by 548 days.

(21) Appl. No.: 13/196,815

(22) Filed: Aug. 2, 2011

Related U.S. Application Data (60) Provisional application No. 61/373,850, filed on Aug. 15, 2010.

(51) Int. Cl.  
*G06F 17/30* (2006.01)  
*G06F 7/00* (2006.01)

(52) U.S. Cl.  
USPC .......................................... 707/740; 707/748

(58) Field of Classification Search  
CPC ............... G06F 17/30772; G06F 17/30749; G06F 17/30766; G06F 17/30053  
USPC ........................................................ 707/740  
See application file for complete search history.

(56) References Cited

U.S. PATENT DOCUMENTS

| | | | | |
|---|---|---|---|---|
| 5,583,763 | A * | 12/1996 | Atcheson et al. | 707/750 |
| 6,526,411 | B1 * | 2/2003 | Ward | 707/999.102 |
| 6,865,600 | B1 * | 3/2005 | Brydon et al. | 709/219 |
| 7,228,054 | B2 * | 6/2007 | Cowgill | 386/243 |
| 7,505,959 | B2 * | 3/2009 | Kaiser et al. | 707/999.006 |
| 7,840,620 | B2 * | 11/2010 | Vignoli et al. | 707/705 |
| 8,260,656 | B1 * | 9/2012 | Harbick et al. | 705/7.31 |
| 2009/0144273 | A1 * | 6/2009 | Kappos | 707/5 |
| 2010/0076958 | A1 * | 3/2010 | Gates et al. | 707/722 |
| 2010/0114979 | A1 * | 5/2010 | Petersen | 707/803 |

OTHER PUBLICATIONS

"A Dating Site for Music Buffs", <<http://www.thefrisky.com/post/246-a-dating-site-for-music-buffs/>>, Jun. 18, 2010, 4 pages.  
"Between Love and Like", <<http://betweenloveandlike.blogspot.com/2009/04/kat-corbett-on-wall-and-dating.html>>, Apr. 30, 2009, 9 pages.  
"Find Your Musical Soulmate with a New Dating Site", <<http://mashable.com/2010/06/18/tastebuds/>>, Jun. 18, 2010, 23 pages.  
"Music Recommendation and Me", <<http://www.thinkflowinteractive.com/2010/05/17/music-recommendation-and-me/>>, May 17, 2010, 3 pages.

(Continued)

*Primary Examiner* — Pavan Mamillapalli  
(74) *Attorney, Agent, or Firm* — Ogilvie Law Firm (57) ABSTRACT

Digital goods libraries are compared via their datasets, which include organizational data and history data. Potential comparison results include a shared multiple natural languages presence, shared genre frequency change, shared artist frequency change, shared digital good frequency change, shared outlier presence, shared similar songs presence, and/or shared recommendable goods presence. Proper subsets of datasets may be specified by playlist, genre, artist, category, date, play frequency, and/or play count, and then compared. Comparison results may be visualized, such as playlist content over time, play frequency over time, and/or play count over time. Some results include printed or spoken text such as an artist name, actor name, author name, genre name, and/or review content. Control over disclosure of library owner identity is provided. In some cases a dataset is compared with multiple datasets in a group, e.g., to help assess compatibility between a prospective member and current members of the group.

72 Claims, 2 Drawing Sheets

(56) References Cited

OTHER PUBLICATIONS

"Here's How the Web Reads Your Mind", <<http://gigaom.com/2010/06/04/heres-how-the-web-reads-your-mind/>>, Jun. 4, 2010, 5 pages.

iTunes(r) screenshot, applicant's computer, Aug, 13, 2010, 1 page.

"Know My Music, Know Me", <<http://onlinedatingpost.com/archives/2006/01/know_my_music_know_me/>>, Jan. 29, 2006, 4 pages.

"Looking for a New Romance? Try the (Genius) Bar Scene!", <<http://open.salon.com/blog/designanator/2009/05/17/looking_for_a_new_romance_try_the_genius_bar_scene>>, May 17, 2009, 11 pages.

"Quizzler Dating for iPhone, iPod touch, and iPad on the iTunes App Store", <<http://itunes.apple.com/us/app/quizzler-dating/id318025787?mt=8>>, no later than Aug. 13, 2010, 2 pages.

"Tastebuds", from <<http://tastebuds.fm/>>, no later than Aug. 13, 2010, 3 pages.

* cited by examiner

ANALYTIC COMPARISON OF LIBRARIES AND PLAYLISTS

RELATED APPLICATION

The present application claims priority to, and fully incorporates by reference, U.S. provisional patent application Ser. No. 61/373,850 filed Aug. 15, 2010.

BACKGROUND

User collections of digital products are sometimes organized in libraries. Some examples of such libraries include iTunes® music libraries (mark of Apple Computer, Inc.). Some additional examples include other libraries whose entry selection and/or modification is or could be digitally tracked, such as other iTunes libraries (e.g., movies, TV shows, podcasts, apps, ringtones, and radio stations), and other libraries containing entries such as songs, videos, games, podcasts, and/or digitally-presented products. Sometimes a library is maintained in conjunction with user activity on sites such as the iTunes store, Last dot fm, Pandora dot com, YouTube dot com, Hula dot com, Amazon dot com, and their respective competing or complementary sites, and in connection with recording systems such as the Tivo system, Comcast On Demand system, etc. (marks of their respective owners). Song plays, game rentals, videos, audio library checkouts, podcasts, online magazines, and other digital goods may be entries in some libraries of user-selected (and/or user-accepted) digital goods. Web analytics, purchasing histories, and other mechanisms used to track user browsing and/or user purchases may also be used to identify library entries.

SUMMARY

Music libraries and other user collections may reflect user preferences and behaviors in ways that provide an opportunity to gain insight about user compatibility with other users and/or user compatibility with particular digital goods. However, impressions obtained casually, such as during a conversation between users who are talking about their playlists, are not readily subject to automated extraction for repeated reliable use across a large number of users.

Some embodiments described herein facilitate repeated reliable comparison of digital goods libraries. After obtaining a first and second dataset, namely, first and second electronic organizational data and first and second electronic history data associated with a first and second library of digital goods, respectively, some embodiments automatically compare at least a portion of the first dataset with at least a portion of the second dataset, with a view toward identifying particular similarities and/or differences discussed herein. The dataset comparison may determine various results, discussed below, which may then be reported.

In some embodiments, for example, comparison results may include items such as a "shared multiple natural languages presence", a "shared genre frequency change", a "shared artist frequency change", a "shared digital good frequency change", a "shared outlier presence", a "shared similar songs presence", and/or a "shared recommendable goods presence". These terms were coined for use herein; their meaning is defined by the claims and illustrated by examples.

Variations independent of the kind of comparison result are also described. In some embodiments, for example, portions of the dataset(s) smaller than the entire dataset in question are compared, and the portion(s) are specified by playlist, genre, artist, category, date, play frequency, and/or play count. Some embodiments visualize report content, such as playlist content over time, play frequency over time, and/or play count over time. Some reports include speech converted from text such as an artist name, actor name, author name, genre name, and/or review content. Some embodiments control disclosure of an identity of one or more owners of the libraries whose datasets are being compared. In addition, comparison is not necessarily limited to two libraries. For example, in some cases a dataset is compared with multiple datasets in a group, e.g., to help assess compatibility between a prospective member of a group of users and current members of the group.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Libraries of digital goods contain or are otherwise associated with "organizational data" and "history data". For example, in an iTunes® (mark of Apple Computer, Inc.) library, song entries have associated organizational data such as categories (name, artist, album, genre, etc.) and associated history data such as a total number of times played and most recent date-and-time played. Songs may be further organized by users into playlists, which are named by the user. Other library entries such as audio books, podcasts, TV shows, videos, games, and the like similarly have (or could be given) organizational data such as categories (name, author, performer(s), publisher, director, rating, genre, difficulty level, price range, etc.), membership in user-defined organizational playlist(s), and history data (number of times played, most recent date-and-time played, first date-and-time played, etc.).

Although iTunes® playlists are used as an example herein, they are not the only collections of user selections to which the analysis and comparison approaches described herein can be applied.

Some embodiments described herein provide tools and techniques for analyzing and/or comparing libraries of user selections and/or portions of such libraries of digital goods, such as playlists and/or category-defined portions such as artists and genres.

Some embodiments described herein may be viewed in a broader context. For instance, concepts such as sharing, frequency, organization, and history may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving sharing, frequency, organization, and history are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell phones, smart phones, other mobile phones, iPod® (mark of Apple Computer, Inc.) and other media players, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation, server, tablet or laptop computers, other embodiments may run on other computing devices such as phones or media players, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

"Computationally" means a computing device (processor plus memory, at least) is being used, and excludes obtaining a computational result by mere human thought or mere human action alone. For example, doing arithmetic with a paper and pencil is not doing arithmetic computationally as understood herein.

Throughout this document, use of the optional plural "(s)", "(es)", or "(ies)" means that one or more of the indicated feature is present. For example, "entry(ies)" means "one or more entries" or equivalently "at least one entry".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as comparing, configuring, converting, determining, disclosing, hiding, obtaining, reporting, specifying, or visualizing (or compares, compared, configures, configured, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example. A memory or other computer-readable medium is presumed to be non-transitory unless expressly stated otherwise.

Operating Environments

Figure 1:
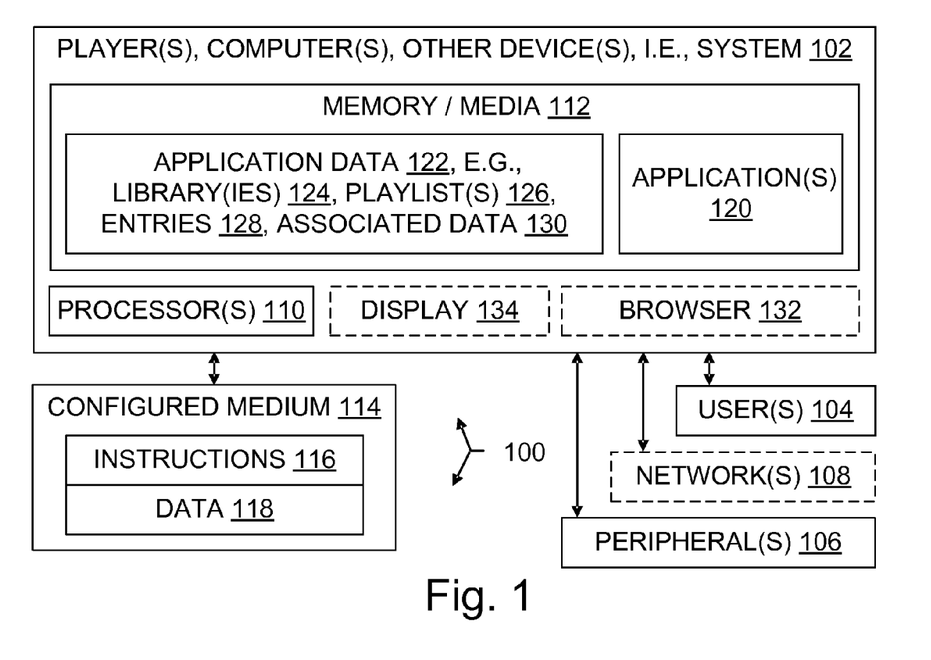
FIG. 1 is a block diagram illustrating a computer, media player, or other system having at least one processor, at least one memory, and other items in an operating environment which may be present on multiple network nodes, and also illustrating configured storage medium embodiments.

With reference to FIG. 1, an operating environment 100 for an embodiment may include a computer, media player, or other system 102. The system 102 may be a multiprocessor system, or not. An operating environment may include one or more machines in a given system, which may be clustered, client-server networked, and/or peer-to-peer networked. An individual machine is a system 102, and a group of cooperating machines is also a system 102. A given system 102 may be configured for end-users, e.g., with applications, for administrators, as a server, as a distributed processing node, and/or in other ways.

Human users 104 may interact with the system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other systems not shown in FIG. 1 may interact with the system 102 or with another system embodiment using one or more connections to a network 108 via network interface equipment, for example.

The system 102 includes at least one logical processor 110. The system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by dataset portioning, analysis, comparison, and reporting as discussed herein.

iTunes® (mark of Apple Computer, Inc.) software, media players, and other applications 120, other software (e.g., kernels, drivers), application data 122, and other items shown in the Figures and/or discussed in the text may reside partially or entirely within one or more media 112, thereby configuring those media. Application data 122 may include, for instance, libraries 124 of music, videos, games, and other digital goods, playlists 126 grouping library 124 entries 128, and associated organizational and history data 130. A web browser 132 may also be present, and may serve as an application 120. In addition to processor(s) 110, and memory 112, an operating environment may also include other hardware, such as displays 134 (touchscreen or otherwise), buses, power supplies, antennae, network interface cards, and accelerators, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
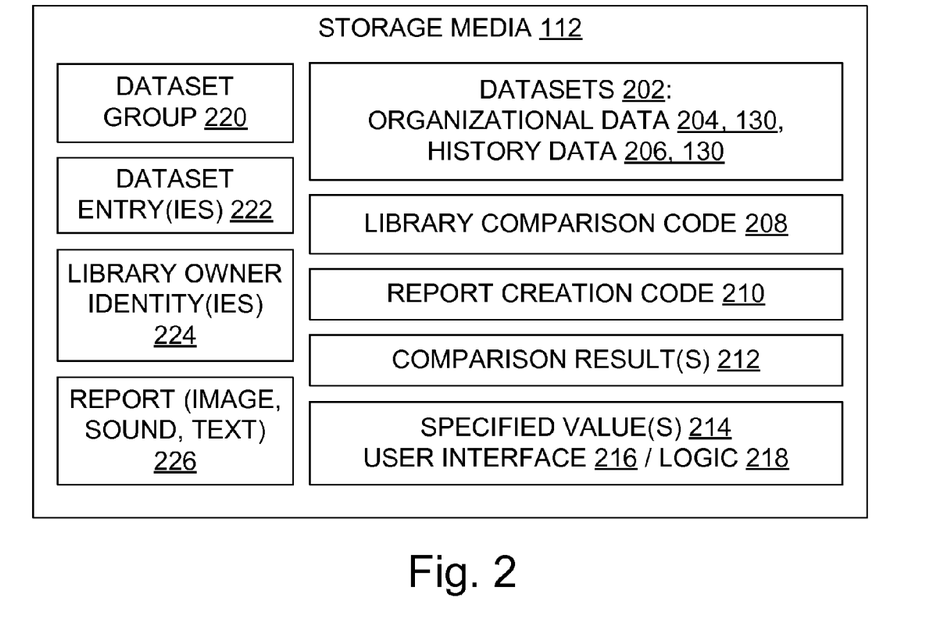
FIG. 2 is a block diagram illustrating aspects of digital goods library dataset comparison in an example architecture.

FIG. 2 illustrates an architecture which is suitable for use with some embodiments. Library datasets 202 include organizational data 204 and/or history data 206. Library comparison code 208 will, upon execution by a processor, perform dataset comparison as described herein. Report creation code 210 will, upon execution by a processor, create a report 226 (e.g., visualization, text-to-speech conversion, display in a user interface) as described herein.

Comparison results 212 determined by the comparison code 208 may include a shared multiple natural languages presence, a shared genre frequency change, a shared artist frequency change, a shared digital good frequency change, a shared outlier presence, a shared similar songs presence, and/or a shared recommendable goods presence. These terms are defined by example herein, including specific examples and examples recited in claims.

Specified values 214 may include counts (a.k.a. numbers), percents (a.k.a. percentages), dates (single and/or ranges), category names, artist names, genre names, and/or other values used to limit or guide comparison of datasets 202. Specified values may be "predetermined", either as defaults or as received from a user through a user interface 216. Alternatively, specified values may be determined by logic 218 (software and hardware operating together) during a comparison of datasets 202.

Some datasets 202 belong to a larger group 220 of datasets. Such datasets are called members of the group. Libraries (and their datasets) have entries 222 representing individual digital goods, e.g., a movie, a game, a song. Library owners (who are users 104) may have one or more identities 224, such as online usernames, an offline personal name and surname, a photo, an avatar, and so on.

Figure 3:
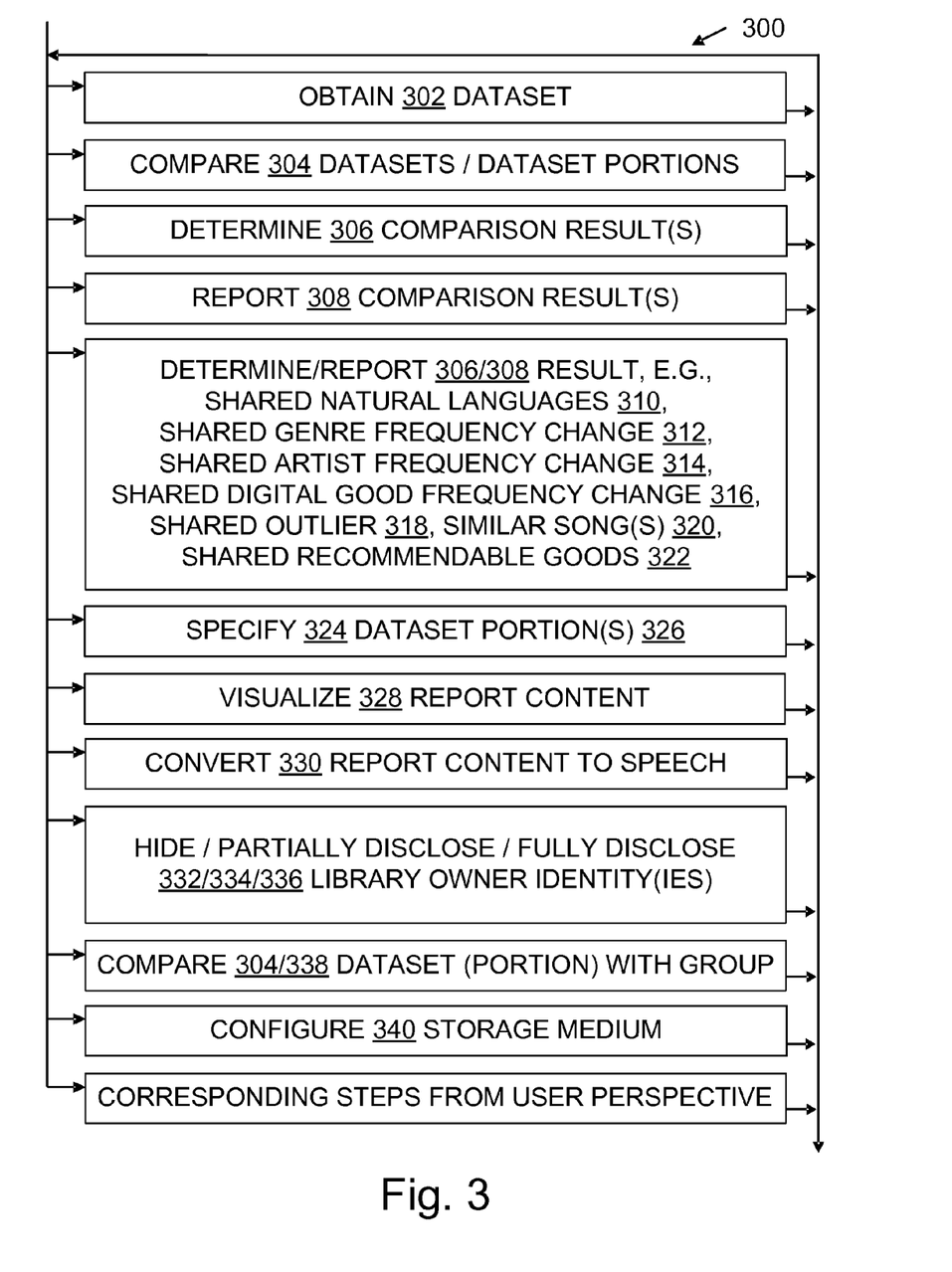
FIG. 3 is a flow chart illustrating steps of some process and configured storage medium embodiments.

With reference to FIGS. 1 through 3, some embodiments provide a computer system 102 with a logical processor 110 and a memory medium 112 configured by circuitry, firmware, and/or software to perform processes for library dataset comparison as described herein. In some, a memory medium is configured by a dataset comparison report 226, by library comparison code 208, by report creation code, and/or by other items described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, datasets 202 and libraries 124 may be on multiple devices/systems 102 in a networked cloud, library comparison code 208 may be stored on yet other devices within the cloud, and the comparison report 226 may configure the display on yet other cloud device(s)/system(s) 102.

Processes

FIG. 3 illustrates some process embodiments in a flowchart 300. Processes shown in the Figures may be performed in some embodiments automatically, e.g., by comparison code 208 under control of a script or otherwise requiring little or no contemporaneous user input to obtain and analyze datasets. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein. The steps and their interrelationships are discussed in greater detail below, in connection with various embodiments.

Some embodiments provide a process for digital good library comparison, e.g., for comparing two or more libraries of digital goods by comparing some or all of their respective datasets 202. The process includes automatically or partially automatically obtaining 302 a first dataset 202, namely, first electronic organizational data 204 and first electronic history data 206 associated with a first library 124 of digital goods. This may be accomplished using APIs (application program interfaces), file systems, networks, and other familiar mechanisms, adapted to obtain a dataset. The process also obtains 302 a second dataset 202, namely, second electronic organizational data and second electronic history data associated with a second library of digital goods. The process automatically compares 304 at least a portion of the first dataset with at least a portion of the second dataset, and reports 308 comparison result(s) 212.

In some embodiments, at least one of the following is a result 212 found or determined 306 by the comparing step: a shared multiple natural languages presence 310, a shared genre frequency change 312, a shared artist frequency change 314, a shared digital good frequency change 316, a shared outlier presence 318, a shared similar songs presence 320, a shared recommendable goods presence 322.

In some embodiments, the comparing step determines, and a reporting step may report, at least one of the following shared multiple natural languages presence results 310, 212: multiple natural languages are present in the first dataset and multiple natural languages (not necessarily the same languages) are present in the second dataset; at least two natural languages which are present in the first dataset are also present in the second dataset.

In some embodiments, the comparing step determines, and a reporting step may report, at least one of the following results 212: a frequency 312 of playing artists in a given genre has changed in the same direction (increased or decreased) in both datasets 202; a frequency 314 of playing a given artist has changed in the same direction in both datasets; a frequency 312 of playing videos or movies in a given genre has changed in the same direction in both datasets; a frequency 316 of playing a given video or a given movie has changed in the same direction in both datasets; a frequency 312 of playing games in a given genre has changed in the same direction in both datasets; a frequency 316 of playing a given game has changed in the same direction in both datasets; a frequency 312 of playing a digital good (song, video, game, et.) in a given genre has changed in the same direction in both datasets; a frequency 316 of playing a given group of digital goods has changed in the same direction in both datasets.

In some embodiments, the comparing step determines, and a reporting step may report, at least one of the following shared outlier results 212, 318: both datasets contain at least N goods in a category C that have not been played in the past D days, for predetermined values 214 of N, C, D; both datasets contain at least N goods in a category C that have not been played in the past D days, for values 214 of N, C, D determined by logic 218 during the comparing step; both datasets 202 contain at least N goods in a category C that have not been played in the past D days, for values 214 of N, C, D which are predetermined and/or determined during the comparing step 304.

In some embodiments, the comparing step determines, and a reporting step may report, at least one of the following shared outlier results 212, 318: for both datasets the greatest number of plays in the past D days is in a category C, for predetermined values 214 of D, C; for both datasets the greatest number of plays in the past D days is in a category C, for values 214 of D, C determined during the comparing step; both datasets have goods in categories C1 and C2 and no goods in category C3, for predetermined values 214 of C1, C2, C3; both datasets have goods in categories C1 and C2 and no goods in category C3, for values 214 of C1, C2, C3 determined during the comparing step; both datasets 202 have goods in category C1 but no playlist containing any goods in category C1, for a predetermined value 214 of C1; both datasets 202 have goods in category C1 but no playlist containing any goods in category C1, for a value 214 of C1 determined during the comparing step.

In some embodiments, the comparing step determines, and a reporting step may report, at least one of the following shared similar songs presence results 212, 320: at least a specified percent 214 of library entries 222 in one dataset are similar to library entries in the other dataset 202 under a song similarity metric, wherein the specified percent is a predetermined percent; at least a specified percent 214 of library entries in one dataset 202 are similar to library entries in the other dataset under a song similarity metric, wherein the specified percent is determined during the comparing step; at least a specified number 214 of library entries 222 in one dataset 202 are similar to library entries in the other dataset under a song similarity metric, wherein the specified number is predetermined; at least a specified number 214 of library entries in one dataset are similar to library entries in the other dataset 202 under a song similarity metric, wherein the specified number is determined during the comparing step.

In some embodiments, the comparing step determines, and a reporting step may report, at least one of the following shared recommendable goods presence results 212, 322: at least a specified percent 214 of library entries 222 in one dataset 202 support a recommendation of library entry(ies) in the other dataset under an automated recommendation system which communicates with the comparison code 208, wherein the specified percent is a predetermined percent; at least a specified percent 214 of library entries in one dataset support a recommendation of library entry(ies) in the other dataset 202 under such an automated recommendation system, wherein the specified percent is determined during the comparing step; at least a specified number 214 of library entries in one dataset support a recommendation of library entry(ies) in the other dataset under such an automated recommendation system, wherein the specified number is a predetermined number; at least a specified number 214 of library entries in one dataset support a recommendation of library entry(ies) in the other dataset under such an automated recommendation system, wherein the specified number is determined during the comparing step.

In some embodiments, the comparing step automatically compares 304 a first portion 326 of the first dataset 202 with a second portion 326 of the second dataset 202. In this context, a "portion" of a dataset is less than the entire dataset 202. In some embodiments, each compared portion is specified by specifying 324 at least one of the following: a playlist 126; a genre; an artist; a category; a date range (closed or open-ended, e.g., "All of April" or "From April 1 to now"); a play frequency range (closed or open, e.g., "three to five times a week" or "at least twice a month"); a play count range (closed or open); a Boolean combination of two or more of the following: playlist, genre, artist, category, date(s), play frequency, play count.

In some embodiments, the reporting step 308 includes visualizing 328 at least one of the following: playlist content over time, play frequency over time, play count over time. In some, reporting 308 includes converting 330 text to speech about at least one of the following: artist name, actor name, author name, genre name, review content. In some embodiments, conversion 330 produces visual text, instead of or in addition to producing audible text.

In some embodiments, each library 124 being compared has an owner 104 with at least one identity 224, such as an online identity and an offline identity. In some, the process includes least one of the following: fully hiding 332 all parts of each identity of each library owner from the other library's owner; fully hiding 332 only one library owner's identity(ies); partially disclosing 334 to each library owner at least one identity of the other library owner; partially disclosing 334 only one library owner's identity(ies); fully disclosing 336 to each library owner at least one identity of the other library owner; fully disclosing 336 only one library owner's identity(ies).

In some embodiments, the process automatically compares 304, 338 at least a portion of the first dataset with at least respective portions of additional datasets in a group 220 of datasets, the second dataset being a member of the group of datasets.

Although the foregoing steps are largely described from an implementation's perspective, it will be understood that corresponding steps from a user perspective also exist in some embodiments. For example, providing a dataset to an implementation through a user interface 216 corresponds to the implementation obtaining 302 the dataset. Viewing comparison results 212 on a display 134 or printout likewise corresponds to reporting 308 comparison results 212, and possibly to visualizing 328 them. Listening to a report 226 corresponds to reporting 308 results that contain converted 330 content. Other correspondences will also be evident to one of skill.

Configured Media

Some embodiments include a configured 340 computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured 340 may be in particular a removable storage medium 114 such as a CD, DVD, or flash memory. A general-purpose memory, which may be removable or not, and may be volatile or not, can be configured into an embodiment using items such as comparison code 208 and reports 226, in the form of data 118 and instructions 116, read from a removable medium 114 and/or another source such as a network connection, to form a configured 340 medium. The configured medium 112 is capable of causing a computer system to perform process steps for transforming data through library dataset comparison as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure 340 a storage medium to form a configured medium embodiment.

Additional Examples

Additional details and design considerations are provided below. As with the other examples herein, the features described may be used individually and/or in combination, or not at all, in a given embodiment.

Some approaches automatically analyze a library 124, or a specified analysis portion 326 thereof such as a playlist or a portion defined by Boolean combination of categories and/or playlists. For example, the portion analyzed may be a specified playlist 126, or the playlist that contains the most Jazz entries, or the playlists if any that contain at least three pieces by Beethoven, or all the songs in the library except ones marked as having explicit lyrics; many other analysis portion definitions are possible.

Some approaches use play threshold(s) 214 to automatically filter in and/or filter out entries 222 of the analysis portion. For example, a zero-played threshold can be used to exclude 324 from further consideration all songs that are present in an iTunes® library (mark of Apple Computer, Inc.) but have never been played. The songs in an analysis portion can be analyzed 304, 306 to define an average number of plays for song in that portion, and then the average can be used as a filtering threshold. The maximum number of plays, or a value based on the max, can likewise be used. For example, an embodiment could identify favored Jazz pieces as those which have been played at least as many times as the average number of plays for all Jazz pieces in the library, and could identify the top 5% or the top three Jazz pieces based on the max number of plays for any Jazz pieces in the analyzed portion.

Some embodiments note 304, 306 the presence 310 of multiple natural languages in the playlist titles, song names, and/or other data 130 of an analyzed portion, using automatic character-set identification, user queries, automated dictionaries, and/or other mechanisms. For example, an embodiment might note the presence of both English and Japanese characters in some titles of an analyzed portion.

Some embodiments have graphical interfaces 216 which automatically visualize 328 aspects of analyzed portions using color, size, motion, and/or other visual elements. Play, playlist content, and other data may be tracked over time and visualized 328. Animation or graphs may visualize 328, for example, that over the past two months the frequency 314 of playing artist A has decreased while the frequency 312 of playing artists in genre G has increased even faster.

Rather than reducing an entire library, or even an entire playlist, to a small bit of flat data such as a single number, or a short burst of audio (so-called musical signature), some embodiments automatically provide 330 text to talk about in the analysis results 212, such as artist/actor/author names, genre names, and review texts.

Some embodiments automatically compare 304 two libraries and report similarities and/or differences. For example, some automatically find 304, 306 shared outliers 318, e.g., both libraries contain at least N songs in category C that have not been played for the past six months; both libraries have the greatest number of frequent plays in the last month in songs of the Rock genre; both libraries have Jazz and Classical but few or no Country entries; both libraries have Rap songs but neither library has a playlist containing any Rap songs; and so on. Many other analysis results 212 can likewise be automatically computed by comparing two libraries or portions thereof. Comparison results 212 can be automatically visualized, with a textual description of the conclusion(s) represented therein.

Some embodiments apply similarity metrics during library comparison, such as song similarity 320 metrics used in Pandora dot com and/or Apple Genius playlist generation, and report 308 accordingly. Similarity may be assessed using embedded code or by communicating with other code outside the embodiment. For example, an embodiment may automatically determine 306 that even though two libraries do not contain many of the same songs, they do contain a high proportion of songs that are similar 320 under the metric. Recommendations 322 could then be automatically made for songs in one library that might be liked by the other library's owner, and vice versa. For other types of goods, metrics such as those used in purchasing recommendation systems, as at Amazon dot com, could be likewise applied 322 to make recommendations to one library owner based on contents of the other person's library.

The offline identity 224 of the two library owners whose libraries 124 are being thus automatically compared 304 may be undisclosed 332 to each other, or partially disclosed 334 (e.g., by disclosing only a username/screen name), or fully disclosed 336.

One-on-one comparison 304 of two individuals' iTunes® or other libraries 124 can be done automatically to help them measure their likely compatibility, e.g., through an online dating site.

Some embodiments compare 304 an individual library or analysis portion thereof to a group 220 of libraries. For example, the iTunes® playlist(s) of a person 104 seeking admission to an online forum focused on genre G or artist A could be automatically compared 304, 338 to the libraries of existing members of the forum, to ascertain likely compatibility.

An implementation may be embodied in various ways, e.g., processes and/or hardware on a server computer, on a client or peer, or on a standalone computer, software (data instructions) in RAM or non-volatile/permanent storage for performing a process, general purpose computer hardware configured by software, special-purpose computer hardware, data produced by a process, a digital memory configured by a process, and so on. Computers, PDAs, cell phones, terminals, and any device having user interface and some network transmission capabilities may be part of a given embodiment. Touch screens, keyboards, other buttons, levers, microphones, speakers, light pens, sensors, scanners, and other I/O devices may be configured to facilitate or perform operations to achieve the methods and systems, and method results, which are described here. Combinations of these may also form a given embodiment. Terms such as "computerized" refer to devices having a microprocessor and memory, not merely to personal computers or servers. "Electronic" refers to digital and/or analog electronic circuitry.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable non-transitory storage medium configured with data and with instructions that when executed by at least one processor causes the processor(s) to perform a process for digital good library comparison, the process comprising:
    obtaining a first dataset, namely, first electronic organizational data and first electronic history data associated with a first library of digital goods;
    obtaining a second dataset, namely, second electronic organizational data and second electronic history data associated with a second library of digital goods;
    automatically comparing at least a portion of the first dataset with at least a portion of the second dataset;
    reporting at least one of the following results:
        a shared multiple natural languages presence,
        a shared genre frequency change,
        a shared artist frequency change,
        a shared digital good frequency change,
        a shared outlier presence,
        a shared recommendable goods presence; and
    wherein the process reports at least one of the following shared outlier results:
        both datasets contain at least N goods in a category C that have not been played in the past D days, for predetermined values of N, C, D;
        both datasets contain at least N goods in a category C that have not been played in the past D days, for values of N, C, D determined at least in part by comparing at least a portion of the first dataset with at least a portion of the second dataset;
        both datasets contain at least N goods in a category C that have not been played in the past D days, for values of N, C, D which are predetermined and/or determined at least in part by comparing at least a portion of the first dataset with at least a portion of the second dataset.

2. The configured medium of claim 1, wherein the process reports at least one of the following shared multiple natural languages presence results:
    multiple natural languages are present in the first dataset and multiple natural languages (not necessarily the same languages) are present in the second dataset;
    at least two natural languages which are present in the first dataset are also present in the second dataset.

3. The configured medium of claim 1, wherein the process reports at least one of the following results:
    a frequency of playing artists in a given genre has changed in the same direction in both datasets;
    a frequency of playing a given artist has changed in the same direction in both datasets;
    a frequency of playing videos or movies in a given genre has changed in the same direction in both datasets;
    a frequency of playing a given video or a given movie has changed in the same direction in both datasets;
    a frequency of playing games in a given genre has changed in the same direction in both datasets;
    a frequency of playing a given game has changed in the same direction in both datasets;
    a frequency of playing a digital good in a given genre has changed in the same direction in both datasets;
    a frequency of playing a given group of digital goods has changed in the same direction in both datasets;
    wherein "changed in the same direction in both datasets" means either increased in both datasets or else decreased in both datasets.

4. The configured medium of claim 1, wherein the process automatically compares a first portion of the first dataset with a second portion of the second dataset, a portion of a dataset being less than the entire dataset, and each compared portion is specified by specifying at least one of the following:
    a playlist;
    a genre;
    an artist;
    a category;
    a date range;
    a play frequency range;
    a play count range;
    a Boolean combination of two or more of the following: playlist, genre, artist, category, date(s), play frequency, play count.

5. The configured medium of claim 1, wherein the process comprises visualizing at least one of the following: playlist content over time, play frequency over time, play count over time.

6. The configured medium of claim 1, wherein the process comprises converting text to speech about at least one of the following: artist name, actor name, author name, genre name, review content.

7. The configured medium of claim 1, wherein each library has an owner with at least one identity, such as an online identity and an offline identity, and the process further comprises at least one of the following:
    fully hiding all parts of each identity of each library owner from the other library's owner;
    fully hiding only one library owner's identity(ies);
    partially disclosing to each library owner at least one identity of the other library owner;
    partially disclosing only one library owner's identity(ies);
    fully disclosing to each library owner at least one identity of the other library owner;
    fully disclosing only one library owner's identity(ies).

8. The configured medium of claim 1, wherein the process further comprises automatically comparing at least a portion of the first dataset with at least respective portions of additional datasets in a group of datasets, the second dataset being a member of the group of datasets.

9. A computer-readable non-transitory storage medium configured with data and with instructions that when executed by at least one processor causes the processor(s) to perform a process for digital good library comparison, the process comprising:
- obtaining a first dataset, namely, first electronic organizational data and first electronic history data associated with a first library of digital goods;
- obtaining a second dataset, namely, second electronic organizational data and second electronic history data associated with a second library of digital goods; and
- automatically comparing at least a portion of the first dataset with at least a portion of the second dataset, thereby determining at least one of the following as a result:
  - a shared genre frequency change,
  - a shared artist frequency change,
  - a shared digital good frequency change,
  - a shared outlier presence,
  - a shared recommendable goods presence;
- wherein the process determines at least one of the following shared outlier results:
  - both datasets contain at least N goods in a category C that have not been played in the past D days, for predetermined values of N, C, D;
  - both datasets contain at least N goods in a category C that have not been played in the past D days, for values of N, C, D determined at least in part by comparing at least a portion of the first dataset with at least a portion of the second dataset;
  - both datasets contain at least N goods in a category C that have not been played in the past D days, for values of N, C, D which are predetermined and/or determined at least in part by comparing at least a portion of the first dataset with at least a portion of the second dataset.

10. The configured medium of claim 9, wherein the process determines at least one of the following results:
- a frequency of playing artists in a given genre has changed in the same direction in both datasets;
- a frequency of playing a given artist has changed in the same direction in both datasets;
- a frequency of playing videos or movies in a given genre has changed in the same direction in both datasets;
- a frequency of playing a given video or a given movie has changed in the same direction in both datasets;
- a frequency of playing games in a given genre has changed in the same direction in both datasets;
- a frequency of playing a given game has changed in the same direction in both datasets;
- a frequency of playing a digital good in a given genre has changed in the same direction in both datasets;
- a frequency of playing a given group of digital goods has changed in the same direction in both datasets.

11. The configured medium of claim 9, wherein the process automatically compares a first portion of the first dataset with a second portion of the second dataset, a portion of a dataset being less than the entire dataset, and each compared portion is specified by specifying at least one of the following:
- a playlist;
- a genre;
- an artist;
- a category;
- a date range;
- a play frequency range;
- a play count range;
- a Boolean combination of two or more of the following: playlist, genre, artist, category, date(s), play frequency, play count.

12. The configured medium of claim 9, wherein the process further comprises automatically comparing at least a portion of the first dataset with at least respective portions of additional datasets in a group of datasets, the second dataset being a member of the group of datasets.

13. A computer-readable non-transitory storage medium configured with data and with instructions that when executed by at least one processor causes the processor(s) to perform a process for digital good library comparison, the process comprising:
- obtaining a first dataset, namely, first electronic organizational data and first electronic history data associated with a first library of digital goods;
- obtaining a second dataset, namely, second electronic organizational data and second electronic history data associated with a second library of digital goods;
- automatically comparing at least a portion of the first dataset with at least a portion of the second dataset;
- reporting at least one of the following results:
  - a shared multiple natural languages presence, a shared genre frequency change,
  - a shared artist frequency change,
  - a shared digital good frequency change,
  - a shared outlier presence,
  - a shared recommendable goods presence; and
- wherein the process reports at least one of the following shared outlier results:
  - for both datasets the greatest number of plays in the past D days is in a category C, for predetermined values of D, C;
  - for both datasets the greatest number of plays in the past D days is in a category C, for values of D, C determined at least in part by comparing at least a portion of the first dataset with at least a portion of the second dataset;
  - both datasets have goods in categories C1 and C2 and no goods in category C3, for predetermined values of C1, C2, C3;
  - both datasets have goods in categories C1 and C2 and no goods in category C3, for values of C1, C2, C3 determined at least in part by comparing at least a portion of the first dataset with at least a portion of the second dataset;
  - both datasets have goods in category C1 but no playlist containing any goods in category C1, for a predetermined value of C1;
  - both datasets have goods in category C1 but no playlist containing any goods in category C1, for a value of C1 determined at least in part by comparing at least a portion of the first dataset with at least a portion of the second dataset.

14. The configured medium of claim 13, wherein the process reports at least one of the following results:
- a frequency of playing artists in a given genre has changed in the same direction in both datasets;
- a frequency of playing videos or movies in a given genre has changed in the same direction in both datasets;
- a frequency of playing games in a given genre has changed in the same direction in both datasets;
- a frequency of playing a digital good in a given genre has changed in the same direction in both datasets;
- wherein "changed in the same direction in both datasets" means either increased in both datasets or else decreased in both datasets.

15. The configured medium of claim 13, wherein the process reports at least one of the following results:
- a frequency of playing a given artist has changed in the same direction in both datasets;
- a frequency of playing a given video or a given movie has changed in the same direction in both datasets;
- a frequency of playing a given game has changed in the same direction in both datasets;
- a frequency of playing a given group of digital goods has changed in the same direction in both datasets;
- wherein "changed in the same direction in both datasets" means either increased in both datasets or else decreased in both datasets.

16. The configured medium of claim 13, wherein the process automatically compares a first portion of the first dataset with a second portion of the second dataset, a portion of a dataset being less than the entire dataset, and each compared portion is specified by specifying at least one of the following:
- a playlist;
- a genre;
- an artist;
- a category;
- a date range.

17. The configured medium of claim 13, wherein the process automatically compares a first portion of the first dataset with a second portion of the second dataset, a portion of a dataset being less than the entire dataset, and each compared portion is specified by specifying at least a Boolean combination of two or more of the following: playlist, genre, artist, category, date(s), play frequency, play count.

18. The configured medium of claim 13, wherein the process comprises visualizing at least one of the following: playlist content over time, play frequency over time, play count over time.

19. The configured medium of claim 13, wherein the process comprises converting text to speech about at least one of the following: artist name, actor name, author name, genre name, review content.

20. The configured medium of claim 13, wherein each library has an owner with at least one identity, such as an online identity and an offline identity, and the process further comprises at least one of the following:
- fully hiding all parts of each identity of each library owner from the other library's owner;
- fully hiding only one library owner's identity(ies).

21. The configured medium of claim 13, wherein each library has an owner with at least one identity, such as an online identity and an offline identity, and the process further comprises at least one of the following:
- partially disclosing to each library owner at least one identity of the other library owner;
- partially disclosing only one library owner's identity(ies);
- fully disclosing to each library owner at least one identity of the other library owner;
- fully disclosing only one library owner's identity(ies).

22. The configured medium of claim 13, wherein the process further comprises automatically comparing at least a portion of the first dataset with at least respective portions of additional datasets in a group of datasets, the second dataset being a member of the group of datasets.

23. A computer-readable non-transitory storage medium configured with data and with instructions that when executed by at least one processor causes the processor(s) to perform a process for digital good library comparison, the process comprising:
- obtaining a first dataset, namely, first electronic organizational data and first electronic history data associated with a first library of digital goods;
- obtaining a second dataset, namely, second electronic organizational data and second electronic history data associated with a second library of digital goods;
- automatically comparing at least a portion of the first dataset with at least a portion of the second dataset;
- reporting at least one of the following results:
  - a shared multiple natural languages presence,
  - a shared genre frequency change,
  - a shared artist frequency change,
  - a shared digital good frequency change,
  - a shared outlier presence,
  - a shared recommendable goods presence; and
- wherein the process also reports at least one of the following shared similar songs presence results:
  - at least a specified percent of library entries in one dataset are similar to library entries in the other dataset under a song similarity metric, wherein the specified percent is a predetermined percent;
  - at least a specified percent of library entries in one dataset are similar to library entries in the other dataset under a song similarity metric, wherein the specified percent is determined at least in part by comparing at least a portion of the first dataset with at least a portion of the second dataset;
  - at least a specified number of library entries in one dataset are similar to library entries in the other dataset under a song similarity metric, wherein the specified number is predetermined;
  - at least a specified number of library entries in one dataset are similar to library entries in the other dataset under a song similarity metric, wherein the specified number is determined at least in part by comparing at least a portion of the first dataset with at least a portion of the second dataset.

24. The configured medium of claim 23, wherein the process reports at least one of the following results:
- a frequency of playing artists in a given genre has changed in the same direction in both datasets;
- a frequency of playing videos or movies in a given genre has changed in the same direction in both datasets;
- a frequency of playing games in a given genre has changed in the same direction in both datasets;
- a frequency of playing a digital good in a given genre has changed in the same direction in both datasets;
- wherein "changed in the same direction in both datasets" means either increased in both datasets or else decreased in both datasets.

25. The configured medium of claim 23, wherein the process reports at least one of the following results:
- a frequency of playing a given artist has changed in the same direction in both datasets;
- a frequency of playing a given video or a given movie has changed in the same direction in both datasets;
- a frequency of playing a given game has changed in the same direction in both datasets;
- a frequency of playing a given group of digital goods has changed in the same direction in both datasets;
- wherein "changed in the same direction in both datasets" means either increased in both datasets or else decreased in both datasets.

26. The configured medium of claim 23, wherein the process automatically compares a first portion of the first dataset with a second portion of the second dataset, a portion of a dataset being less than the entire dataset, and each compared portion is specified by specifying at least one of the following:
- a playlist;
- a genre;
- an artist;
- a category;
- a date range.

27. The configured medium of claim 23, wherein the process automatically compares a first portion of the first dataset with a second portion of the second dataset, a portion of a dataset being less than the entire dataset, and each compared portion is specified by specifying at least a Boolean combination of two or more of the following: playlist, genre, artist, category, date(s), play frequency, play count.

28. The configured medium of claim 23, wherein the process comprises visualizing at least one of the following: playlist content over time, play frequency over time, play count over time.

29. The configured medium of claim 23, wherein the process comprises converting text to speech about at least one of the following: artist name, actor name, author name, genre name, review content.

30. The configured medium of claim 23, wherein each library has an owner with at least one identity, such as an online identity and an offline identity, and the process further comprises at least one of the following:
- fully hiding all parts of each identity of each library owner from the other library's owner;
- fully hiding only one library owner's identity(ies).

31. The configured medium of claim 23, wherein each library has an owner with at least one identity, such as an online identity and an offline identity, and the process further comprises at least one of the following:
- partially disclosing to each library owner at least one identity of the other library owner;
- partially disclosing only one library owner's identity(ies);
- fully disclosing to each library owner at least one identity of the other library owner;
- fully disclosing only one library owner's identity(ies).

32. The configured medium of claim 23, wherein the process further comprises automatically comparing at least a portion of the first dataset with at least respective portions of additional datasets in a group of datasets, the second dataset being a member of the group of datasets.

33. A computer-readable non-transitory storage medium configured with data and with instructions that when executed by at least one processor causes the processor(s) to perform a process for digital good library comparison, the process comprising:
- obtaining a first dataset, namely, first electronic organizational data and first electronic history data associated with a first library of digital goods;
- obtaining a second dataset, namely, second electronic organizational data and second electronic history data associated with a second library of digital goods;
- automatically comparing at least a portion of the first dataset with at least a portion of the second dataset;
- reporting at least one of the following results:
  - a shared multiple natural languages presence,
  - a shared genre frequency change,
  - a shared artist frequency change,
  - a shared digital good frequency change,
  - a shared outlier presence,
  - a shared recommendable goods presence; and
- wherein the process reports at least one of the following shared recommendable goods presence results:
  - at least a specified percent of library entries in one dataset support a recommendation of library entry(ies) in the other dataset under an automated recommendation system, wherein the specified percent is a predetermined percent;
  - at least a specified percent of library entries in one dataset support a recommendation of library entry(ies) in the other dataset under an automated recommendation system, wherein the specified percent is determined at least in part by comparing at least a portion of the first dataset with at least a portion of the second dataset;
  - at least a specified number of library entries in one dataset support a recommendation of library entry(ies) in the other dataset under an automated recommendation system, wherein the specified number is a predetermined number;
  - at least a specified number of library entries in one dataset support a recommendation of library entry(ies) in the other dataset under an automated recommendation system, wherein the specified number is determined at least in part by comparing at least a portion of the first dataset with at least a portion of the second dataset.

34. The configured medium of claim 33, wherein the process reports at least one of the following results:
- a frequency of playing artists in a given genre has changed in the same direction in both datasets;
- a frequency of playing videos or movies in a given genre has changed in the same direction in both datasets;
- a frequency of playing games in a given genre has changed in the same direction in both datasets;
- a frequency of playing a digital good in a given genre has changed in the same direction in both datasets;
- wherein "changed in the same direction in both datasets" means either increased in both datasets or else decreased in both datasets.

35. The configured medium of claim 33, wherein the process reports at least one of the following results:
- a frequency of playing a given artist has changed in the same direction in both datasets;
- a frequency of playing a given video or a given movie has changed in the same direction in both datasets;
- a frequency of playing a given game has changed in the same direction in both datasets;
- a frequency of playing a given group of digital goods has changed in the same direction in both datasets;
- wherein "changed in the same direction in both datasets" means either increased in both datasets or else decreased in both datasets.

36. The configured medium of claim 33, wherein the process automatically compares a first portion of the first dataset with a second portion of the second dataset, a portion of a dataset being less than the entire dataset, and each compared portion is specified by specifying at least one of the following:
- a playlist;
- a genre;
- an artist;
- a category;
- a date range.

37. The configured medium of claim 33, wherein the process automatically compares a first portion of the first dataset with a second portion of the second dataset, a portion of a dataset being less than the entire dataset, and each compared portion is specified by specifying at least a Boolean combination of two or more of the following: playlist, genre, artist, category, date(s), play frequency, play count.

38. The configured medium of claim 33, wherein the process comprises visualizing at least one of the following: playlist content over time, play frequency over time, play count over time.

39. The configured medium of claim 33, wherein the process comprises converting text to speech about at least one of the following: artist name, actor name, author name, genre name, review content.

40. The configured medium of claim 33, wherein each library has an owner with at least one identity, such as an online identity and an offline identity, and the process further comprises at least one of the following:
fully hiding all parts of each identity of each library owner from the other library's owner;
fully hiding only one library owner's identity(ies).

41. The configured medium of claim 33, wherein each library has an owner with at least one identity, such as an online identity and an offline identity, and the process further comprises at least one of the following:
partially disclosing to each library owner at least one identity of the other library owner;
partially disclosing only one library owner's identity(ies);
fully disclosing to each library owner at least one identity of the other library owner;
fully disclosing only one library owner's identity(ies).

42. The configured medium of claim 33, wherein the process further comprises automatically comparing at least a portion of the first dataset with at least respective portions of additional datasets in a group of datasets, the second dataset being a member of the group of datasets.

43. A computer-readable non-transitory storage medium configured with data and with instructions that when executed by at least one processor causes the processor(s) to perform a process for digital good library comparison, the process comprising:
obtaining a first dataset, namely, first electronic organizational data and first electronic history data associated with a first library of digital goods;
obtaining a second dataset, namely, second electronic organizational data and second electronic history data associated with a second library of digital goods; and
automatically comparing at least a portion of the first dataset with at least a portion of the second dataset, thereby determining at least one of the following as a result:
a shared genre frequency change,
a shared artist frequency change,
a shared digital good frequency change,
a shared outlier presence,
a shared recommendable goods presence;
wherein the process determines at least one of the following shared outlier results:
for both datasets the greatest number of plays in the past D days is in a category C, for predetermined values of D, C;
for both datasets the greatest number of plays in the past D days is in a category C, for values of D, C determined at least in part by comparing at least a portion of the first dataset with at least a portion of the second dataset;
both datasets have goods in categories C1 and C2 and no goods in category C3, for predetermined values of C1, C2, C3;
both datasets have goods in categories C1 and C2 and no goods in category C3, for values of C1, C2, C3 determined at least in part by comparing at least a portion of the first dataset with at least a portion of the second dataset;
both datasets have goods in category C1 but no playlist containing any goods in category C1, for a predetermined value of C1;
both datasets have goods in category C1 but no playlist containing any goods in category C1, for a value of C1 determined at least in part by comparing at least a portion of the first dataset with at least a portion of the second dataset.

44. The configured medium of claim 43, wherein the process determines at least one of the following results:
a frequency of playing artists in a given genre has changed in the same direction in both datasets;
a frequency of playing videos or movies in a given genre has changed in the same direction in both datasets;
a frequency of playing games in a given genre has changed in the same direction in both datasets;
a frequency of playing a digital good in a given genre has changed in the same direction in both datasets;
wherein "changed in the same direction in both datasets" means either increased in both datasets or else decreased in both datasets.

45. The configured medium of claim 43, wherein the process determines at least one of the following results:
a frequency of playing a given artist has changed in the same direction in both datasets;
a frequency of playing a given video or a given movie has changed in the same direction in both datasets;
a frequency of playing a given game has changed in the same direction in both datasets;
a frequency of playing a given group of digital goods has changed in the same direction in both datasets;
wherein "changed in the same direction in both datasets" means either increased in both datasets or else decreased in both datasets.

46. The configured medium of claim 43, wherein the process automatically compares a first portion of the first dataset with a second portion of the second dataset, a portion of a dataset being less than the entire dataset, and each compared portion is specified by specifying at least one of the following:
a playlist;
a genre;
an artist;
a category;
a date range.

47. The configured medium of claim 43, wherein the process automatically compares a first portion of the first dataset with a second portion of the second dataset, a portion of a dataset being less than the entire dataset, and each compared portion is specified by specifying at least a Boolean combination of two or more of the following: playlist, genre, artist, category, date(s), play frequency, play count.

48. The configured medium of claim 43, wherein the process further comprises automatically comparing at least a portion of the first dataset with at least respective portions of additional datasets in a group of datasets, the second dataset being a member of the group of datasets.

49. The configured medium of claim 43, wherein the process determines at least one of the following shared outlier results:
for both datasets the greatest number of plays in the past D days is in a category C, for predetermined values of D, C;
for both datasets the greatest number of plays in the past D days is in a category C, for values of D, C determined at least in part by comparing at least a portion of the first dataset with at least a portion of the second dataset.

50. The configured medium of claim 43, wherein the process determines at least one of the following shared outlier results:
- both datasets have goods in categories C1 and C2 and no goods in category C3, for predetermined values of C1, C2, C3;
- both datasets have goods in categories C1 and C2 and no goods in category C3, for values of C1, C2, C3 determined at least in part by comparing at least a portion of the first dataset with at least a portion of the second dataset.

51. The configured medium of claim 43, wherein the process determines at least one of the following shared outlier results:
- both datasets have goods in category C1 but no playlist containing any goods in category C1, for a predetermined value of C1;
- both datasets have goods in category C1 but no playlist containing any goods in category C1, for a value of C1 determined at least in part by comparing at least a portion of the first dataset with at least a portion of the second dataset.

52. The configured medium of claim 43, wherein the process determines at least one of the following shared outlier results:
- for both datasets the greatest number of plays in the past D days is in a category C, for predetermined values of D, C;
- both datasets have goods in categories C1 and C2 and no goods in category C3, for predetermined values of C1, C2, C3;
- both datasets have goods in category C1 but no playlist containing any goods in category C1, for a predetermined value of C1.

53. A computer-readable non-transitory storage medium configured with data and with instructions that when executed by at least one processor causes the processor(s) to perform a process for digital good library comparison, the process comprising:
- obtaining a first dataset, namely, first electronic organizational data and first electronic history data associated with a first library of digital goods;
- obtaining a second dataset, namely, second electronic organizational data and second electronic history data associated with a second library of digital goods; and
- automatically comparing at least a portion of the first dataset with at least a portion of the second dataset, thereby determining at least one of the following as a result:
  - a shared genre frequency change,
  - a shared artist frequency change,
  - a shared digital good frequency change,
  - a shared outlier presence,
  - a shared recommendable goods presence;
- wherein the process also determines at least one of the following shared similar songs presence results:
  - at least a specified percent of library entries in one dataset are similar to library entries in the other dataset under a song similarity metric, wherein the specified percent is a predetermined percent;
  - at least a specified percent of library entries in one dataset are similar to library entries in the other dataset under a song similarity metric, wherein the specified percent is determined at least in part by comparing at least a portion of the first dataset with at least a portion of the second dataset;
  - at least a specified number of library entries in one dataset are similar to library entries in the other dataset under a song similarity metric, wherein the specified number is predetermined;
  - at least a specified number of library entries in one dataset are similar to library entries in the other dataset under a song similarity metric, wherein the specified number is determined at least in part by comparing at least a portion of the first dataset with at least a portion of the second dataset.

54. The configured medium of claim 53, wherein the process determines at least one of the following results:
- a frequency of playing artists in a given genre has changed in the same direction in both datasets;
- a frequency of playing videos or movies in a given genre has changed in the same direction in both datasets;
- a frequency of playing games in a given genre has changed in the same direction in both datasets;
- a frequency of playing a digital good in a given genre has changed in the same direction in both datasets;
- wherein "changed in the same direction in both datasets" means either increased in both datasets or else decreased in both datasets.

55. The configured medium of claim 53, wherein the process determines at least one of the following results:
- a frequency of playing a given artist has changed in the same direction in both datasets;
- a frequency of playing a given video or a given movie has changed in the same direction in both datasets;
- a frequency of playing a given game has changed in the same direction in both datasets;
- a frequency of playing a given group of digital goods has changed in the same direction in both datasets;
- wherein "changed in the same direction in both datasets" means either increased in both datasets or else decreased in both datasets.

56. The configured medium of claim 53, wherein the process automatically compares a first portion of the first dataset with a second portion of the second dataset, a portion of a dataset being less than the entire dataset, and each compared portion is specified by specifying at least one of the following:
- a playlist;
- a genre;
- an artist;
- a category;
- a date range.

57. The configured medium of claim 53, wherein the process automatically compares a first portion of the first dataset with a second portion of the second dataset, a portion of a dataset being less than the entire dataset, and each compared portion is specified by specifying at least a Boolean combination of two or more of the following: playlist, genre, artist, category, date(s), play frequency, play count.

58. The configured medium of claim 53, wherein the process further comprises automatically comparing at least a portion of the first dataset with at least respective portions of additional datasets in a group of datasets, the second dataset being a member of the group of datasets.

59. The configured medium of claim 53, wherein the process determines at least the following shared similar songs presence result: at least a specified percent of library entries in one dataset are similar to library entries in the other dataset under a song similarity metric, wherein the specified percent is a predetermined percent.

60. The configured medium of claim 53, wherein the process determines at least the following shared similar songs presence result: at least a specified percent of library entries in one dataset are similar to library entries in the other dataset under a song similarity metric, wherein the specified percent is determined at least in part by comparing at least a portion of the first dataset with at least a portion of the second dataset.

61. The configured medium of claim 53, wherein the process determines at least the following shared similar songs presence result: at least a specified number of library entries in one dataset are similar to library entries in the other dataset under a song similarity metric, wherein the specified number is predetermined.

62. The configured medium of claim 53, wherein the process determines at least the following shared similar songs presence result: at least a specified number of library entries in one dataset are similar to library entries in the other dataset under a song similarity metric, wherein the specified number is determined at least in part by comparing at least a portion of the first dataset with at least a portion of the second dataset.

63. A computer-readable non-transitory storage medium configured with data and with instructions that when executed by at least one processor causes the processor(s) to perform a process for digital good library comparison, the process comprising:
  obtaining a first dataset, namely, first electronic organizational data and first electronic history data associated with a first library of digital goods;
  obtaining a second dataset, namely, second electronic organizational data and second electronic history data associated with a second library of digital goods; and
  automatically comparing at least a portion of the first dataset with at least a portion of the second dataset, thereby determining at least one of the following as a result:
    a shared genre frequency change,
    a shared artist frequency change,
    a shared digital good frequency change,
    a shared outlier presence,
    a shared recommendable goods presence;
  wherein the process determines at least one of the following shared recommendable goods presence results:
    at least a specified percent of library entries in one dataset support a recommendation of library entry(ies) in the other dataset under an automated recommendation system, wherein the specified percent is a predetermined percent;
    at least a specified percent of library entries in one dataset support a recommendation of library entry(ies) in the other dataset under an automated recommendation system, wherein the specified percent is determined at least in part by comparing at least a portion of the first dataset with at least a portion of the second dataset;
    at least a specified number of library entries in one dataset support a recommendation of library entry(ies) in the other dataset under an automated recommendation system, wherein the specified number is a predetermined number;
    at least a specified number of library entries in one dataset support a recommendation of library entry(ies) in the other dataset under an automated recommendation system, wherein the specified number is determined at least in part by comparing at least a portion of the first dataset with at least a portion of the second dataset.

64. The configured medium of claim 63, wherein the process determines at least one of the following results:
  a frequency of playing artists in a given genre has changed in the same direction in both datasets;
  a frequency of playing videos or movies in a given genre has changed in the same direction in both datasets;
  a frequency of playing games in a given genre has changed in the same direction in both datasets;
  a frequency of playing a digital good in a given genre has changed in the same direction in both datasets;
  wherein "changed in the same direction in both datasets" means either increased in both datasets or else decreased in both datasets.

65. The configured medium of claim 63, wherein the process determines at least one of the following results:
  a frequency of playing a given artist has changed in the same direction in both datasets;
  a frequency of playing a given video or a given movie has changed in the same direction in both datasets;
  a frequency of playing a given game has changed in the same direction in both datasets;
  a frequency of playing a given group of digital goods has changed in the same direction in both datasets;
  wherein "changed in the same direction in both datasets" means either increased in both datasets or else decreased in both datasets.

66. The configured medium of claim 63, wherein the process automatically compares a first portion of the first dataset with a second portion of the second dataset, a portion of a dataset being less than the entire dataset, and each compared portion is specified by specifying at least one of the following:
  a playlist;
  a genre;
  an artist;
  a category;
  a date range.

67. The configured medium of claim 63, wherein the process automatically compares a first portion of the first dataset with a second portion of the second dataset, a portion of a dataset being less than the entire dataset, and each compared portion is specified by specifying at least a Boolean combination of two or more of the following: playlist, genre, artist, category, date(s), play frequency, play count.

68. The configured medium of claim 63, wherein the process further comprises automatically comparing at least a portion of the first dataset with at least respective portions of additional datasets in a group of datasets, the second dataset being a member of the group of datasets.

69. The configured medium of claim 63, wherein the process determines at least the following shared recommendable goods presence result: at least a specified percent of library entries in one dataset support a recommendation of library entry(ies) in the other dataset under an automated recommendation system, wherein the specified percent is a predetermined percent.

70. The configured medium of claim 63, wherein the process determines at least the following shared recommendable goods presence result: at least a specified percent of library entries in one dataset support a recommendation of library entry(ies) in the other dataset under an automated recommendation system, wherein the specified percent is determined at least in part by comparing at least a portion of the first dataset with at least a portion of the second dataset.

71. The configured medium of claim 63, wherein the process determines at least the following shared recommendable goods presence result: at least a specified number of library entries in one dataset support a recommendation of library entry(ies) in the other dataset under an automated recommendation system, wherein the specified number is a predetermined number.

72. The configured medium of claim 63, wherein the process determines at least the following shared recommendable goods presence result: at least a specified number of library entries in one dataset support a recommendation of library entry(ies) in the other dataset under an automated recommendation system, wherein the specified number is determined at least in part by comparing at least a portion of the first dataset with at least a portion of the second dataset.

* * * * *